US010352328B2

(12) United States Patent
Chow et al.

(10) Patent No.: US 10,352,328 B2
(45) Date of Patent: Jul. 16, 2019

(54) FAN CASE BUSHING

(71) Applicant: UNITED TECHNOLOGIES CORPORATION, Hartford, CT (US)

(72) Inventors: Wai Tuck Chow, Singapore (SG); Ron I. Prihar, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 517 days.

(21) Appl. No.: 14/948,432

(22) Filed: Nov. 23, 2015

(65) Prior Publication Data

US 2017/0146018 A1 May 25, 2017

(51) Int. Cl.

| | |
|---|---|
| ***F16D 1/033*** | (2006.01) |
| ***F04D 29/056*** | (2006.01) |
| ***F04D 19/00*** | (2006.01) |
| ***F04D 29/52*** | (2006.01) |
| ***F04D 29/64*** | (2006.01) |
| ***F01D 25/24*** | (2006.01) |

(52) U.S. Cl.

CPC ......... *F04D 29/056* (2013.01); *F01D 25/243* (2013.01); *F04D 19/002* (2013.01); *F04D 29/522* (2013.01); *F04D 29/526* (2013.01); *F04D 29/644* (2013.01); *F05B 2230/60* (2013.01); *F05B 2260/301* (2013.01); *F05D 2230/60* (2013.01); *F05D 2230/80* (2013.01); *F05D 2260/31* (2013.01)

(58) Field of Classification Search

CPC ............. Y10T 403/645; Y10T 403/648; F04D 29/056; F04D 29/522; F04D 29/526; F04D 29/644; F01D 25/243; F05D 2260/31; F05B 2260/301; F16B 2200/506; F16B 2200/50

See application file for complete search history.

(56) References Cited

U.S. PATENT DOCUMENTS

| | | | | | |
|---|---|---|---|---|---|
| 986,506 | A * | 3/1911 | Sargent | B23K 33/004 174/21 JS |
| 2,477,447 | A * | 7/1949 | Fawick | F16D 3/70 464/72 |
| 2,565,606 | A * | 8/1951 | Guy | F16D 3/70 464/72 |
| 2,764,266 | A * | 9/1956 | Haworth | F01D 5/066 285/187 |

(Continued)

FOREIGN PATENT DOCUMENTS

| | | | |
|---|---|---|---|
| EP | 1777377 | A2 | 4/2007 |
| FR | 2922588 | A1 | 4/2009 |

OTHER PUBLICATIONS

European Extended Search Report dated Mar. 29, 2017, issued in the corresponding European Patent Application No. 16200352.9.

(Continued)

*Primary Examiner* — Matthew R McMahon

(74) *Attorney, Agent, or Firm* — Bachman & LaPointe, P.C.

(57) ABSTRACT

A bushing including a body portion including a cylinder portion having a bore there through configured to receive a bolt; a flange portion orthogonal and integral to the cylinder portion, the flange portion configured to abut a load bearing surface of a flange; a lip portion orthogonal to and integral to the flange portion proximate the cylinder portion, wherein the lip portion redistributes a flange load.

5 Claims, 2 Drawing Sheets

(56) References Cited

U.S. PATENT DOCUMENTS

| | | | | | |
|---|---|---|---|---|---|
| 2,889,396 | A * | 6/1959 | Boden | H01H 33/025 | 174/161 R |
| 3,235,291 | A * | 2/1966 | Lewis | F16L 17/00 | 138/140 |
| 4,540,389 | A * | 9/1985 | Ramsey | F16G 3/06 | 24/37 |
| 4,721,008 | A * | 1/1988 | Stoops | B62D 1/10 | 74/552 |
| 4,830,557 | A * | 5/1989 | Harris | F16B 37/044 | 411/112 |
| 4,953,777 | A | 9/1990 | Griffith et al. | | |
| 5,052,891 | A * | 10/1991 | Burkholder | F01D 5/066 | 29/525 |
| 6,238,131 | B1 * | 5/2001 | Watts | A01D 61/02 | 198/844.2 |
| 6,467,988 | B1 * | 10/2002 | Czachor | F01D 25/243 | 403/337 |
| 6,641,326 | B2 * | 11/2003 | Schilling | F16B 5/0275 | 403/337 |
| 7,094,029 | B2 * | 8/2006 | Taylor | F01D 11/14 | 415/213.1 |
| 7,121,758 | B2 * | 10/2006 | McMillan | F01D 21/045 | 403/408.1 |
| 7,618,232 | B2 * | 11/2009 | Bil | F01D 5/22 | 415/69 |
| 8,079,773 | B2 | 12/2011 | Blanton | | |
| 8,544,598 | B2 * | 10/2013 | Gaudry | B64D 33/02 | 181/213 |
| 8,757,919 | B2 * | 6/2014 | Samuelsson | F01D 5/30 | 403/337 |
| 9,605,730 | B2 * | 3/2017 | Phillips | F16G 3/06 | |
| 2003/0118399 | A1 | 6/2003 | Schilling et al. | | |
| 2012/0301286 | A1 | 11/2012 | Boletis et al. | | |
| 2016/0201505 | A1 * | 7/2016 | Clarkson | F01D 25/243 | 415/200 |
| 2018/0066697 | A1 * | 3/2018 | Leslie | F01D 5/06 | |

OTHER PUBLICATIONS

European Office action dated Jul. 30, 2018, issued in the corresponding European Patent Application No. 16200352.9.

* cited by examiner

FAN CASE BUSHING

BACKGROUND

The present disclosure is directed to adding a lip feature to a fan case flange shoulder bushing to allow for more efficient load distribution.

Gas turbine engine assemblies include an engine casing that extends around the turbine engine. Engine casings are fabricated from segmented sections that are coupled together via flanges extending from the sections of the casing. Adjacent flanges are coupled together with fasteners. The fasteners are inserted through flange bolt holes in parallel flanges extending perpendicularly outward from the casing section.

The flange bolt is typically made of a steel alloy. The steel bolt material is needed to withstand the forces of a break away fan blade or other fan component failure. The forces that impinge on the casing from a failed fan component are known as Fan Blade Out loads.

The casing material is typically an aluminum alloy. Thus the flange bolt material and the flange of the casing are dissimilar metals. Due to the dissimilar metals, corrosion is formed on the fan case flange bolt holes. This is due to the galvanic corrosion between the steel bolt and aluminum fan case. As the corrosion becomes more severe, the hole diameter becomes elongated. As a result, the bearing area between the bolt head and the flange hole is reduced.

The reduced bolt hole area results in insufficient parent material to withstand the Fan Blade Out load. Moreover, the reduced bearing area of the flange hole can be located near the fillet radius of the flange. Eventually, the corrosion reduces the bolt hole capability so it no longer meets the Fan Blade Out load. If no repair is conducted, the case can no longer be placed into service and will be scrapped at significant financial costs.

Rather than scraping the casing, a repair is conducted on the flange bolt hole. The flange bolt hole corrosion is removed and the bolt hole is enlarged. A bushing is placed in the bolt hole to receive the flange bolt. In order to redistribute the load to a bigger hole, a shoulder bushing design is used.

In order to have sufficient material to meet the requirements of the Fan Blade Out load, the thickness of the shoulder bushing is made larger, in some cases to a dimension of 0.070 inches. The bolt length is made longer in order to cater to the greater bushing thickness. Changing the bolt length requires new engineering design to ensure that the new bolt length meets the design loads. A formal Design Change including engineering time and cost is required to justify use of the longer bolt length. A Design Change creates added cost.

SUMMARY

In accordance with the present disclosure, there is provided a bushing comprising a body portion including a cylinder portion having a bore there through configured to receive a bolt. A flange portion is orthogonal and integral to the cylinder portion. The flange portion is configured to abut a load bearing surface of a flange. A lip portion is orthogonal to and integral to the flange portion proximate the cylinder portion, wherein the lip portion redistributes a flange load.

In another and alternative embodiment, the bore is configured to align with a centerline of a flange bolt hole.

In another and alternative embodiment, the cylinder portion is configured to insert into the flange bolt hole.

In another and alternative embodiment, the flange portion comprises a bushing inner face and a bushing outer face opposite thereof, the bushing inner face being configured to abut a flange load bearing surface and the outer face configured to abut at least one of a washer, and a nut.

In another and alternative embodiment, the lip portion comprises a curvilinear shape that matches a fillet formed on the flange.

In another and alternative embodiment, the lip portion abuts a portion of the load bearing surface proximate a fillet region of the flange.

In another and alternative embodiment, the lip portion further comprises an inner radius and an outer radius opposite the inner radius, wherein the outer radius is configured to match a radius of a fillet of the flange.

In accordance with the present disclosure, there is provided a casing flange coupling assembly comprises a first casing comprising a first flange, the first flange including at least one bolt hole. A second casing is coupled to the first casing, the second casing comprising a second flange, the second flange including at least one bolt hole aligned with the first flange bolt hole. A bushing is coupled to the second flange, the bushing comprises a body portion including a cylinder portion having a bore configured to receive a bolt. A flange portion is orthogonal and integral to the cylinder portion. The flange portion is configured to couple with a load bearing surface of the second flange. A lip portion is integral to the flange portion proximate the cylinder portion, wherein the lip portion redistributes a flange load. The bolt is inserted through the bore and the first flange at least one bolt hole.

In another and alternative embodiment, the lip portion comprises a curvilinear shape that matches a radius of a fillet of the second flange.

In another and alternative embodiment, the lip portion extends from the cylinder portion to a lip end face, the lip end face being adjacent to and orthogonal to a portion of the load bearing surface.

In another and alternative embodiment, the lip portion is configured to bear a portion of the flange load along the fillet and parts of the casing proximate a fillet region.

In another and alternative embodiment, the lip portion comprises a varying thickness extending distally from the cylinder portion to the lip end face.

In another and alternative embodiment, the bushing body portion comprises a reduced portion located in a bushing outer face proximate the bore opposite the cylinder portion.

In accordance with the present disclosure, there is provided a method of redistributing a flange load for a repaired casing flange bolt hole comprises coupling a first casing flange with a second casing flange; coupling a bushing with the second flange bolt hole, and redistributing a flange load with a lip portion of the bushing.

In another and alternative embodiment, the lip portion comprises an outer radius that matches a radius of a fillet of the second flange.

In another and alternative embodiment, the process further comprises bearing the flange load with the lip portion along a fillet region of the second flange and the second casing.

In another and alternative embodiment, the process further comprises varying a thickness of the lip portion extending along the lip portion proximate the fillet region.

In another and alternative embodiment, the lip portion and a thickness of the bushing varies responsive to at least one of a diameter of a bolt and a diameter of the casing flange bolt hole.

In another and alternative embodiment, the process further comprises reducing the thickness of the bushing to retain a flange bolt length equal to a flange bolt length prior to the flange repair.

In another and alternative embodiment, the reducing step includes providing a reducing portion located in the bushing at an outer face proximate a bore of the bushing.

Other details of the fan casing bushing are set forth in the following detailed description and the accompanying drawing wherein like reference numerals depict like elements.

DETAILED DESCRIPTION

Figure 1:
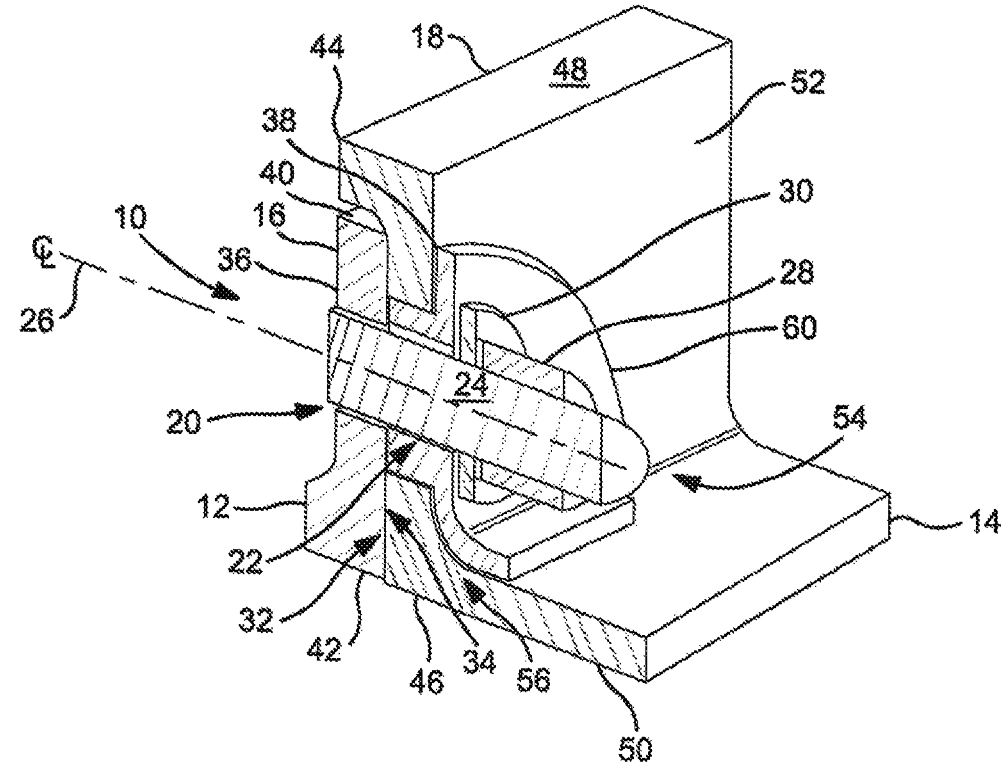
FIG. 1 is a partial sectional view of an exemplary casing flange joint with shoulder busing and bolt assembly.

Referring now to FIG. 1, there is illustrated an exemplary embodiment of a coupling assembly 10 that may be used to fasten a pair of components 12 and 14 together. In the exemplary embodiment, components 12 and 14 are casing sections coupled together for use with a turbine engine assembly (not shown). Coupling assembly 10 is not limited to being used with turbine casing components 12 and 14, but rather coupling assembly 10 may be used to couple any adjacent components together. The specific size, shape, and configuration of coupling assembly 10, as described and/or illustrated herein, is exemplary only. Accordingly, the specific size, shape, and/or configuration of coupling assembly 10 generally, as well as portions thereof, may be selected to accommodate other components than engine casing sections 12 and 14.

In an exemplary embodiment, each casing 12 and 14 includes a respective flange 16 and 18. In the exemplary embodiment, each flange 16 and 18 extends substantially perpendicularly outward from each respective casing 12 and 14. Alternatively, depending on the application of coupling assembly 10, each flange 16 and 18 may be oriented at any angle relative to each respective casing 12 and 14, or may extend from any other component, that enables coupling assembly 10 to function.

Each casing 12, 14 includes a flange 16, 18 respectively, such that there is a first flange 16 and second flange 18. Each of the first flange 16 and second flange 18 includes a bolt hole 20, 22 respectively. The bolt holes 20, 22 are configured to receive a flange bolt, or simply bolt 24. The bolt 24 is inserted through each flange bolt hole 20, 22 aligned along a centerline 26. The bolt 24 is securely fastened with a nut 28. An optional washer or spacer 30 can be inserted over the bolt 24 and paired with the nut 28.

In an exemplary embodiment, casing 12 and 14 are annular structures; each flange 16 and 18 extends circumferentially around each respective casing 12 and 14. Each flange 16 and 18 includes a respective mating surface 32 and 34 and an oppositely disposed load bearing surface 36 and 38, respectively. In the exemplary embodiment, at least a portion of mating surface 32 and 34 is substantially parallel to at least a portion of each respective loading surface 36 and 38. Each flange bolt hole 20, 24, respectively, extends between each respective mating surface 32 and 34 and each load bearing surface 36 and 38.

In an exemplary embodiment, flange 16 has a generally rectangular cross-sectional profile and is formed such that mating surface 32 extends from an end surface 40 of flange 16 to an inner surface 42 of casing 12. Moreover, in the exemplary embodiment, mating surface 32 is substantially parallel to load bearing surface 36, and bolt hole 20 is oriented substantially perpendicularly to surfaces 32 and 36. Similarly, mating surface 34 extends from an end surface 44 of flange 18 to an inner surface 46 of casing 14, and is substantially perpendicular to casing 14 inner surface 46.

Flange 14 is formed with an outer end portion 48, an inner end portion 50, and a body portion 52 extending integrally between outer end portion 48 and inner end portion 50. In an exemplary embodiment, flange body portion 52 has a substantially rectangular cross-sectional profile, and as such, within flange body portion 52, load bearing surface 38 is substantially parallel to mating surface 34.

The flange 18 includes a fillet or radius portion 54 in the body portion 52 between the outer end portion 48 and inner end portion 50. The fillet 54 forms the transition between the casing 14 and the flange body portion 52. The fillet 54 is opposite the mating surface 34 and can form a portion of the load bearing surface 38.

Figure 2:
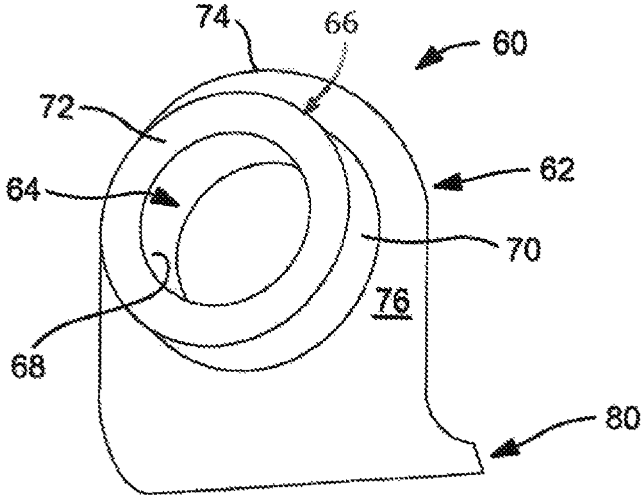
FIG. 2 is a rear perspective view of an exemplary shoulder bushing.
Figure 3:
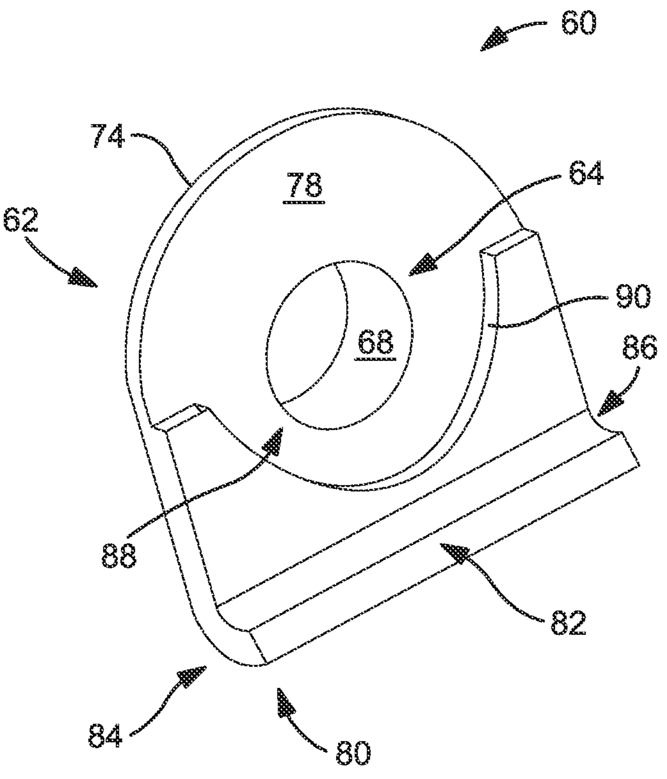
FIG. 3 is a perspective front view of the exemplary shoulder bushing of FIG. 2.

Referring also to FIG. 2 and FIG. 3, the coupling assembly 10 includes a bushing 60. Bushing 60 can be a shoulder bushing having a body portion 62 forming a bore 64 configured to receive the bolt 24, insertable through the bore 64. The bore 64 is configured to align with the centerline 26.

The body portion 62 includes a cylinder portion 66 that encircles the bore 64 and is configured to insert into the bolt hole 22 of flange 18. In an exemplary embodiment, the cylinder portion 66 can be interference fit into the bolt hole 22. The cylinder portion 66 includes an inner diameter 68 and outer diameter 70. The inner diameter 68 is configured to receive the bolt 24. The outer diameter 70 is configured to insert into and abut the bolt hole 22. Cylinder portion 66 can be substantially cylindrical in shape. The cylinder portion 66 includes a face 72 formed between the inner diameter 68 and outer diameter 70. The face 72 can be a planar circular surface. Upon installation of the bushing 60, the face 72 can be located along the same plane as the mating surface 34. The face 72 serves to couple against the mating surface 32 of flange 16 in addition to the mating surface 34 of the flange 18 when the coupling assembly 10 is in service.

The body portion 62 includes a flange portion 74. Flange portion 74 of the bushing 60 extends from the cylinder portion 66 along a plane substantially perpendicular or orthogonal to the bore 64 and parallel with a plane of the face 72. In the coupling assembly 10, the flange portion 74 abuts the load bearing surface 38 of flange 18 and functions to distribute the load across an area of the load bearing surface 38. The flange portion 74 includes a bushing inner face 76 proximate the cylinder portion 66. The flange portion includes a bushing outer face 78 opposite the bushing inner face 76. The bushing inner face 76 is configured to abut the load bearing surface 38. The outer face 78 is configured to abut at least one of the nut 28 and the washer 30 or in alternative arrangements, a bolt head (not shown).

The body portion 62 also includes a lip portion 80. The lip portion 80 is a curvilinear shape that matches the same shape of the fillet 54 of the flange 18 and casing 14. The lip portion 80 is integral to and adjoins the flange portion 74. The lip portion 80 curves and extends from the cylinder portion 66 outward to a lip end face 82. The lip end face 82 can be substantially parallel to the bushing outer face 78 and/or the face 72 of the cylinder portion 66. In another exemplary embodiment, the lip end face 82 is formed as a rectilinear surface. The lip portion 80 extends from said cylinder portion such that the lip end face 82 is orthogonal to a portion of said load bearing surface 38 proximate the casing 14 beyond the fillet 54. The lip portion 80 is configured to bear a portion of the load along the fillet 54 and parts of the casing 14 proximate the fillet 54. The lip portion 80 can include a varying thickness extending from the cylinder portion 66 outwardly to the lip end face 82. In an exemplary embodiment, the lip portion 80 can include a greater thickness than the flange portion 74. The thickness of the flange portion 74 and lip portion as well as the entire bushing 60 can vary depending on the size of the bolt hole 20, 22 and the diameter of the flange bolt 24. In an exemplary embodiment the ratio of the thickness of the lip portion 80 to the flange portion 74 thickness is about 2 to 1. In an exemplary embodiment, the ratio of the thickness of the lip portion 80 the case flange 18 thickness is about 3 to 1. The lip portion 80 includes an outer radius 84 and an inner radius 86 opposite thereof. The outer radius 84 matches the radius of the fillet 54.

The lip portion 80 provides additional load bearing capacity for the bushing 60. The lip portion 80 provides load bearing along a fillet region 56 of the flange 18 and casing 14. In an exemplary embodiment, the lip portion 80 can extend outwardly away from the outer face 78 about 3 times the diameter of the bolt hole 22.

In an exemplary embodiment, the body portion 62 can include a reduced portion 88 located in the bushing outer face 78 proximate the bore 64. The reduced portion 88 of the outer face 78 is configured to abut at least one of the nut 28 and the washer 30 or in alternative arrangements, a bolt head (not shown). A ledge 90 is formed in the outer face 78 proximate the reduced portion 88. The ledge 90 can be a curvilinear shape and match the shape of the cylinder portion 66 and be configured to receive the washer 30 and/or the nut 28 or bolt head. The ledge 90 defines a region of greater thickness in the bushing body portion 62 than the relatively thinner reduced portion 88 of the bushing outer face 78.

The addition of the lip portion 80 allows for more efficient load redistribution. The resultant load redistribution allows for a reduction in the thickness of the bushing 60. In an exemplary embodiment, the thickness requirement can be reduced from 0.07 inches to about 0.05 inches.

The novel shoulder bushing design redistributes the load to a bigger bolt hole after corrosion has been removed. The bearing load from the bolt concentrates at 6 o'clock of the bolt hole proximate the fillet region. The lip portion proximate to the 6 o'clock position provides the stiffness to redistribute the load tangentially away from the hole. Since the shape of the lip portion can be dependent upon the flange geometry, the lip portion thickness can vary.

In an exemplary embodiment, the novel shoulder bushing design allows a thinner bushing 60 (e.g., 0.035") such that the existing bolt 24 can still be used in the assembly 10.

The additional load bearing capacity of the lip portion 80 allows for a more narrow bushing 60 and allows the bolt 24 to remain a similar length to the original bolt 24 length, thus eliminating the need to perform an additional Design Change, saving considerable expenses and design/repair/replacement schedule.

The novel shoulder bushing design eliminates the need to scrap the corroded fan case, as the corrosion gets worse. The new bushing design allows the repair of the expensive component and continued service.

There has been provided a casing flange bushing. While the casing flange bushing has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A casing flange coupling assembly comprising:

a first casing comprising a first flange, said first flange including at least one circular bolt hole;

a second casing coupled to said first casing, said second casing comprising a second flange, said second flange including at least one circular bolt hole aligned with said first flange bolt hole, wherein said second flange at least one bolt hole has a diameter larger than said first flange at least one circular bolt hole diameter;

a bushing coupled to said second flange, said bushing comprising a body portion including a cylinder portion having a circular bore configured to receive a circular bolt, said cylinder portion having an outer diameter configured to insert into and abut the second flange at least one bolt hole; a flange portion orthogonal and integral to said cylinder portion, said flange portion configured to couple with a load bearing surface of said second flange; a lip portion integral to said flange portion proximate said cylinder portion, wherein said lip portion redistributes a flange load; and said circular bolt inserted through said circular bore and said first flange at least one circular bolt hole;

wherein said lip portion comprises a curvilinear shape that matches a radius of a fillet of said second flange.

2. The casing flange coupling assembly according to claim 1, wherein said lip portion extends from said cylinder portion to a lip end face, said lip end face being adjacent to and orthogonal to a portion of said load bearing surface.

3. The casing flange coupling assembly according to claim 2, wherein said lip portion comprises a varying thickness extending distally from said cylinder portion to the lip end face.

4. The casing flange coupling assembly according to claim 1, wherein said lip portion is configured to bear a portion of the flange load along the fillet and parts of the second casing proximate a fillet region.

5. The casing flange coupling assembly according to claim 1, wherein said bushing body portion comprises a reduced portion located in a bushing outer face proximate said bore opposite said cylinder portion.

* * * * *